United States Patent
Spesser

(10) Patent No.: US 10,011,179 B2
(45) Date of Patent: Jul. 3, 2018

(54) METHOD FOR OPERATING A RESONANT DC-DC CONVERTER OF A CHARGER

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 153 days.

(21) Appl. No.: 15/078,150

(22) Filed: Mar. 23, 2016

(65) Prior Publication Data

US 2016/0311333 A1 Oct. 27, 2016

(30) Foreign Application Priority Data

Apr. 24, 2015 (DE) .......................... 10 2015 106 335

(51) Int. Cl.
*B60L 11/18* (2006.01)
*H02J 7/02* (2016.01)
*H02J 7/00* (2006.01)

(52) U.S. Cl.
CPC ........... *B60L 11/1811* (2013.01); *H02J 7/022* (2013.01); *H02J 2007/0059* (2013.01)

(58) Field of Classification Search
CPC ............................ B60L 11/1811; H02J 7/022; H02J 2007/0059
See application file for complete search history.

(56) References Cited

U.S. PATENT DOCUMENTS

| 4,131,829 | A | | 12/1978 | Gocho |
| 4,860,185 | A | * | 8/1989 | Brewer ...................... G06F 1/28 307/66 |
| 6,150,794 | A | | 11/2000 | Yamada et al. |
| 6,314,005 | B1 | * | 11/2001 | Nishi ................ H02M 3/33523 363/21.08 |
| 6,747,883 | B2 | * | 6/2004 | Yasumura ........... H02M 3/3385 363/132 |
| 7,035,119 | B2 | * | 4/2006 | Koike ............... H02M 3/33523 363/19 |

(Continued)

FOREIGN PATENT DOCUMENTS

| CN | 201269922 | 7/2009 |
| DE | 26 45 507 | 4/1977 |

(Continued)

OTHER PUBLICATIONS

German Search Report of Dec. 15, 2015.
Japanese Office Action dated May 31, 2017.

*Primary Examiner* — Naum B Levin
(74) *Attorney, Agent, or Firm* — Gerald E. Hespos; Michael J. Porco; Matthew T. Hespos

(57) ABSTRACT

A method is provided for operating a DC-DC converter (22) of a charger (20). The DC-DC converter has on a primary side a first transformation coil (28) and at least one second transformation coil (30) that are arranged in series one behind another and also alongside a secondary side transformation coil (48). A respective semiconductor switch is connected in parallel with the at least one second primary side transformation coil (30). The at least one second primary side transformation coil (30) is switched either on or off by the semiconductor switch depending on a present value of at least one operating parameter of the charger (20).

8 Claims, 4 Drawing Sheets

(56) References Cited

U.S. PATENT DOCUMENTS

| | | | | |
|---|---|---|---|---|
| 7,209,369 B1* | 4/2007 | Yasumura | | H02M 1/34 363/16 |
| 7,388,762 B2* | 6/2008 | Yasumura | | H02M 3/33507 363/21.02 |
| 7,450,404 B2* | 11/2008 | Chang | | H02M 3/33592 363/21.03 |
| 7,522,430 B2* | 4/2009 | Osaka | | H02M 3/33569 363/21.02 |
| 7,570,497 B2* | 8/2009 | Jacques | | H02M 3/33507 363/21.03 |
| 7,652,231 B2* | 1/2010 | Kagan | | H05B 6/04 219/663 |
| 7,791,312 B2* | 9/2010 | Kook | | H02J 7/0044 320/108 |
| 8,912,687 B2* | 12/2014 | Kesler | | B60L 11/182 307/10.1 |
| 8,988,902 B2* | 3/2015 | Gao | | H02M 3/33523 363/19 |
| 9,379,617 B2* | 6/2016 | Nishikawa | | H02M 1/081 |
| 9,500,170 B2* | 11/2016 | Nong | | F02M 51/061 |
| 9,502,985 B2* | 11/2016 | Werner | | H02M 3/33515 |
| 9,647,567 B2* | 5/2017 | Jacques | | H02M 3/3385 |
| 9,755,534 B2* | 9/2017 | Mao | | H02M 3/3376 |
| 2006/0170288 A1* | 8/2006 | Usui | | H02M 3/33523 307/17 |
| 2007/0297198 A1* | 12/2007 | Chang | | H02M 3/33561 363/17 |
| 2013/0094248 A1* | 4/2013 | Jacques | | H02M 3/3385 363/19 |
| 2013/0121044 A1* | 5/2013 | Gao | | H02M 1/32 363/50 |
| 2013/0194831 A1 | 8/2013 | Hu | | |
| 2014/0132066 A1 | 5/2014 | Hirano | | |
| 2015/0049515 A1* | 2/2015 | Zhao | | H02M 3/3376 363/17 |
| 2016/0056704 A1* | 2/2016 | Deboy | | H02M 3/33592 363/21.13 |
| 2016/0218625 A1* | 7/2016 | Chen | | H02M 3/33515 |
| 2016/0281673 A1* | 9/2016 | Skowronek | | F02P 17/12 |
| 2016/0365795 A1* | 12/2016 | Madsen | | H02M 3/158 |
| 2017/0201180 A1* | 7/2017 | Jacques | | H02M 3/33507 |

FOREIGN PATENT DOCUMENTS

| | | |
|---|---|---|
| DE | 44 37 876 | 5/1995 |
| EP | 2 863 531 | 5/2013 |
| GB | 2508001 | 5/2014 |
| JP | H01248961 A | 10/1989 |
| JP | H07274499 A | 10/1995 |
| JP | 2000036420 A | 2/2000 |
| JP | 2005-65395 | 3/2005 |
| JP | 2006060953 A | 3/2006 |
| JP | 2008312394 A | 12/2008 |
| JP | 2010130708 A | 6/2010 |
| JP | 2012005265 A | 1/2012 |
| JP | 2012-130173 | 7/2012 |
| JP | 2014096945 A | 5/2014 |

* cited by examiner

METHOD FOR OPERATING A RESONANT DC-DC CONVERTER OF A CHARGER

CROSS REFERENCE TO RELATED APPLICATION

This application claims priority under 35 USC 119 to German Patent Appl. No. 10 2015 106 335.2 filed on Apr. 24, 2015, the entire disclosure of which is incorporated herein by reference.

BACKGROUND

1. Field of the Invention

The invention relates to a method for operating a DC-DC converter for a charger, to a DC-DC converter, and to a charger for a motor vehicle.

2. Description of the Related Art

A motor vehicle that has and uses at least one electric motor for driving or locomotion is referred to as an electric vehicle or hybrid vehicle. During travel, the at least one electric motor is to be supplied with electrical energy from at least one electrical energy store, which can also be referred to as battery or rechargeable battery. The at least one electrical energy store, in turn, is supplied with electrical energy in a charging operation. A charger on board the motor vehicle is used for this purpose. Operating parameters of the charger change during a charging operation and influence a charging operation is also influenced.

DE 26 45 507 A1 describes an electrical power converter for a rechargeable battery of an electric vehicle. The electrical power converter is designed to convert a DC voltage of the rechargeable battery into an AC voltage. This makes it possible to feed a drive motor of the electric vehicle from the rechargeable battery. The drive motor has a comparatively high voltage, while the rechargeable battery has a low voltage.

DE 44 37 876 A1 describes a method for operating an electrical power supply in an electric vehicle. The power supply comprises a first battery for an electrical vehicle drive and a second battery, chargeable via a DC-DC converter, for feeding other loads in the electric vehicle. In this case, the DC-DC converter is activated only if a load requirement made of it has reached an expedient minimum value.

U.S. Pat. No. 6,150,794 discloses a charging system for a motor-driven vehicle. The charging system has two chargers, each of which has a coil. A battery of the vehicle can be charged by the charging system if the coils of both chargers are arranged at a small distance from one another.

CN 201269922 Y discloses an automatic detection system for a battery that is designed to control its operation so that only a small amount of heat is generated.

Against this background, it is an object of the present invention to optimize an efficiency of a charger of a motor vehicle with at least one DC-DC converter.

SUMMARY

The method of the invention is for operating a DC-DC converter of a charger. The DC-DC converter has on the primary side a first coil embodied as a transformation coil and at least one second coil embodied as a transformation coil. The coils are arranged in series one behind another and also alongside a secondary side coil embodied as a transformation coil. A semiconductor switch is connected in parallel with the at least one second primary side transformation coil. The at least one second primary side transformation coil is switched either on or off by the semiconductor switch depending on a present value of at least one operating parameter of the charger.

The DC-DC converter comprises alongside the first primary side transformation coil a further second primary side transformation coil or, if appropriate, a plurality of second primary side transformation coils. All of the primary side transformation coils are arranged one behind another in series and alongside the secondary side transformation coil. A respective semiconductor switch is connected in parallel with each further, at least one second primary side transformation coil. Alongside the first primary side transformation coil, a variably adjustable number of second primary side transformation coils are to be switched on or off via the respectively assigned semiconductor switch, as a result of which a variably adjustable number of turns are to be activated or deactivated.

All active primary side transformation coils generate an electromagnetic field if a current in the form of an AC current flows through them. The electromagnetic field induces an AC current in the secondary side transformation coil arranged alongside. A resonant frequency of the DC-DC converter is influenced by the number of active primary side transformation coils.

A temperature of the charger and/or of the DC-DC converter and also a current that flows through the charger and/or the DC-DC converter may be taken into account as the at least one operating parameter.

The at least one second primary side transformation coil is switched on or off additionally depending on values of the at least one operating parameter which was detected in the past.

At least one switch, generally two switches, may be connected in series with the transformation coils. The at least one switch is either closed or opened depending on the present value of the at least one operating parameter of the charger.

Moreover characteristic curve of the at least one operating parameter is taken into account.

The DC-DC converter may be provided for a charger and comprises on the primary side a first transformation coil and at least one second transformation coil that are arranged in series one behind another and also alongside a secondary side coil of the DC-DC converter. A respective semiconductor switch is connected in parallel with the at least one second primary side transformation coil. The at least one second primary side transformation coil may be switched either on or off by the semiconductor switch depending on a present value of at least one operating parameter of the charger.

The at least one switch may be connected in series with the transformation coils. In this case, the at least one switch is either to be closed or opened depending on the present value of the at least one operating parameter of the charger.

In an embodiment, the at least one respective semiconductor switch that is arranged in parallel with the at least one second transformation coil is embodied e.g. as a field effect transistor and/or silicon carbide semiconductor.

The DC-DC converter may further comprise a computing unit, by means of which a state of the respective at least one semiconductor switch is to be altered by the at least one semiconductor switch being switched on or off for activating or deactivating the at least one second primary side transformation coil.

In a further embodiment, a current measuring circuit is connected in series with the transformation coils, and at least one operating parameter of the DC-DC converter is detected by the current measuring circuit. The computing unit is connected to the current measuring circuit at two measuring points, via which the current measuring circuit is to be monitored by the computing unit. The current measuring circuit is embodied e.g. as a measuring resistor or current transformer, usually an inductive current transformer, for measuring a current that flows through the current measuring circuit.

The at least one switch may be opened or closed by the computing unit.

The DC-DC converter may comprise a primary-side electrical circuit having at least the first and the at least one second primary side transformation coil as electronic components, with the primary side transformation coils being connected in series. Likewise within the primary-side electrical circuit, the at least one switch is connected in series with the primary side transformation coils, e.g. at the start and/or at the end of the primary-side electrical circuit. In a further embodiment, the current measuring circuit also is connected in series with the primary side transformation coils. Moreover, at least one inductor coil and at least one capacitor may be connected in series with the transformation coils. At least one semiconductor switch may be connected in parallel with the at least one second transformation coil.

The charger of the invention may be designed for charging an electrical energy store and has at least one DC-DC converter described. The charger is to be used in a motor vehicle for charging an electrical energy store of the motor vehicle.

The electrical energy store may be a traction battery of a so-called plug-in vehicle hybrid or electric vehicle, and charging may comprise connecting the electrical energy store to a stationary electricity grid via the charger. The charger arranged in the motor vehicle is designed to supervise and thus to control and/or to regulate the charging process or charging operation for charging the electrical energy store and itself.

The charger comprises electronic components, e.g. diodes, at least one galvanically isolated transformer, at least one metal oxide semiconductor field effect transistor (MOSFET), etc. The charger carries out a parameter-controlled changeover when carrying out charging operation by varying a number of active primary side transformation coils to compensate for a decrease in efficiency. An increase in an internal resistance of the electronic components as the current intensity rises is to be reduced by the charger when carrying out the method.

The temperature loading and/or current loading of the charger may be supervised as at least one operating parameter of the charger. For changing over or changing charging operation, individual transformation coils and thus turns of the at least one resonant DC-DC converter as transformer are turned on or off. Thus, controller parameters of the at least one resonant converter, e.g. LLC, and of the at least one resonant DC-DC converter as at least one further electronic component are adapted.

An efficiency of the charger is to be optimized over the entire operating range. The charger may comprise individual electronic stages that are formed from the electronic components. One such electronic stage may be a power factor correction filter referred to as a Power Factor Correction or PFC stage. Such a power factor correction filter current may be drawn sinusoidally at high powers. An intermediate circuit as a further electronic stage may be designed for storing electrical energy. The presented DC-DC converter as at least one electronic stage of the charger may be designed for a galvanically isolated transmission of electrical energy via a transformer.

A passive rectifier stage as a further electronic stage may be connected downstream of the electronic stages on a secondary side for smoothing an AC voltage signal during the charging of the electrical energy store, usually a high-voltage battery.

In one embodiment, a transformer inductance is supervised and thus optimized. It is furthermore taken into account that the efficiency is dependent at least on a value of a driving current that flows through the charger. In this case, a loss as a result of internal resistance of individual electronic stages and thus of individual electronic components or of electronic component parts is proportional to a magnitude of the current. The charger may further comprise at least one rectifier diode, at least one galvanically isolated transformer and at least one MOSFET.

The charger may be a highly integrated charger having a power of 7.2 kW, 11 kW or 22 kW, and at least one resonantly switching DC-DC converter may be used as an electronic stage for a galvanically isolated transmission of the electrical energy. The at least one resonant DC-DC converter comprises, as electronic components, capacitors, inductances or coils and electronic switches, usually embodied as MOSFETs. The resonant DC-DC converter keeps the transmission of the electrical energy at a resonance point depending on the load point. In this case, electrical energy subsequently is fed at high frequency by the MOSFETs, and the resonant DC-DC converter is put into and/or kept at resonance.

Different software and/or hardware functions of the charger may be supervised. In this case, one module of the charger is to assess an integral of previous charging powers as operating parameters that were detected in the past. Moreover, a further module may assess a coolant temperature as an operating parameter. One module of the charger may assess a throughput of electrical energy as an operating parameter. A further module, such a thermal sensor or thermometer, is to detect an external temperature of the charger as an operating parameter. Moreover, one module embodied as a thermal sensor may detect an inner or internal temperature as an operating parameter of the charger.

A present power as an operating parameter of a respective power path, e.g. of the primary- or secondary-side electrical circuit, of the charger may be detected and assessed by a module provided for this purpose. At least one further module may detect an actual operating state of current loading of electronic components, e.g. of semiconductors and transformers, as an operating parameter of the charger. An actual state of voltage loading of such electronic components may be detected as an operating parameter by a module provided for this purpose. An assessment of a climatic environment of the charger by means of an integral approach over a time period of recent days, weeks or months as an operating parameter may be assessed by a module designed for this purpose.

One module may output a value for an increase in an additional power as an operating parameter. The charger also may comprise one module for a charging station for charging management to carry out a recommendation of the increase in power. Moreover, the resonant frequency and number of turns of the primary-side circuit of the at least one resonant DC-DC converter are to be adapted concomitantly during operation. Furthermore, one module may assess a hysteresis for a point in time of a changeover.

All data concerning values of the operating parameters that are detected and taken into account for setting an optimum efficiency in the context of the method may be collected in a central module, e.g. a main module, and may be assessed thereby. The central module may be the computing unit of the DC-DC converter. Furthermore, these collected data are calculated by the central module or the computing unit. While carrying out a software function and while taking account at least one characteristic curve of at least one operating parameter that is stored in the computing unit, the point in time of a changeover is subsequently calculated by the computing unit. In one embodiment, the abovementioned modules are implemented as hardware and/or software functions in the computing unit of the DC-DC converter presented.

Further advantages and embodiments of the invention are evident from the description and the accompanying drawing.

It goes without saying that the features mentioned above and those yet to be explained below can be used not only in the combination respectively indicated, but also in other combinations or by themselves, without departing from the scope of the present invention.

The invention is illustrated schematically on the basis of embodiments in the drawings and is described schematically and thoroughly with reference to the drawings.

DETAILED DESCRIPTION

Figure 1:
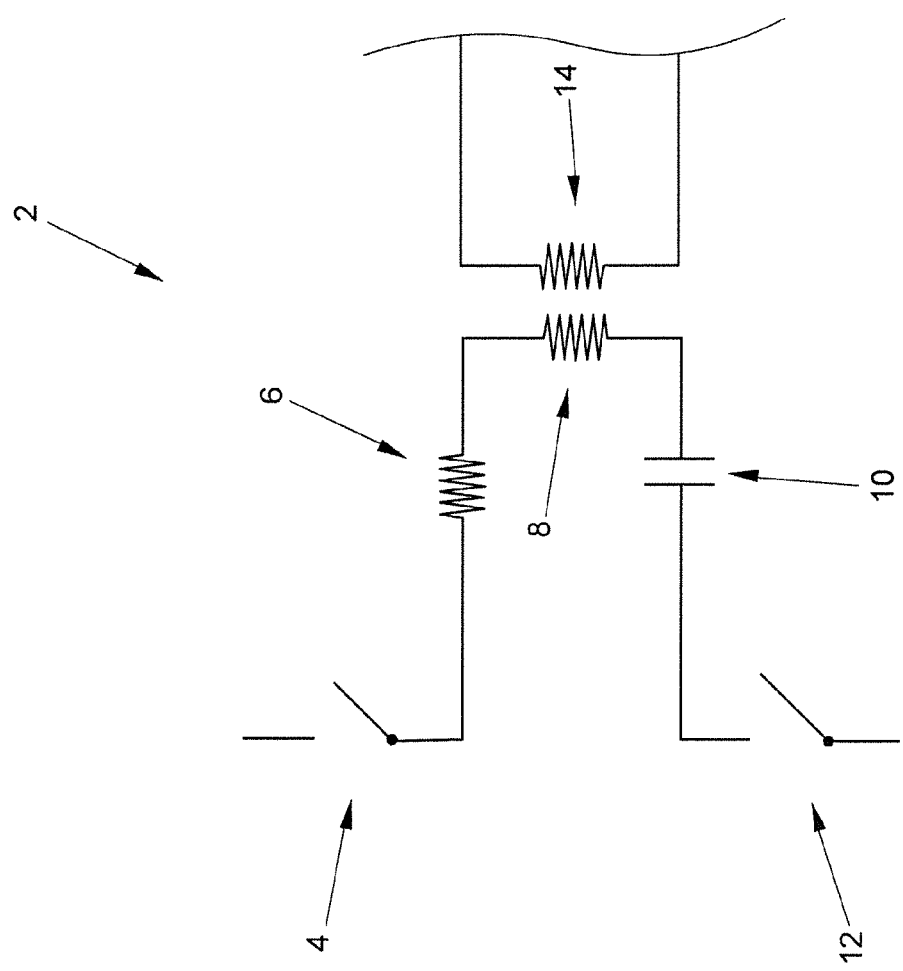
FIG. 1 is a schematic illustration of a customary typology of a resonant DC-DC converter.

An example of a resonant, galvanically isolated DC-DC converter 2 is illustrated schematically in FIG. 1 and comprises on the primary side a first switch 4, embodied here as a transistor, a first coil 6, a second coil 8, a capacitor 10 and a further switch 12, embodied as a transistor. Furthermore, said DC-DC converter 2 comprises on the secondary side a coil 14, which is arranged parallel and next to the primary-side second coil 8.

Figure 2:
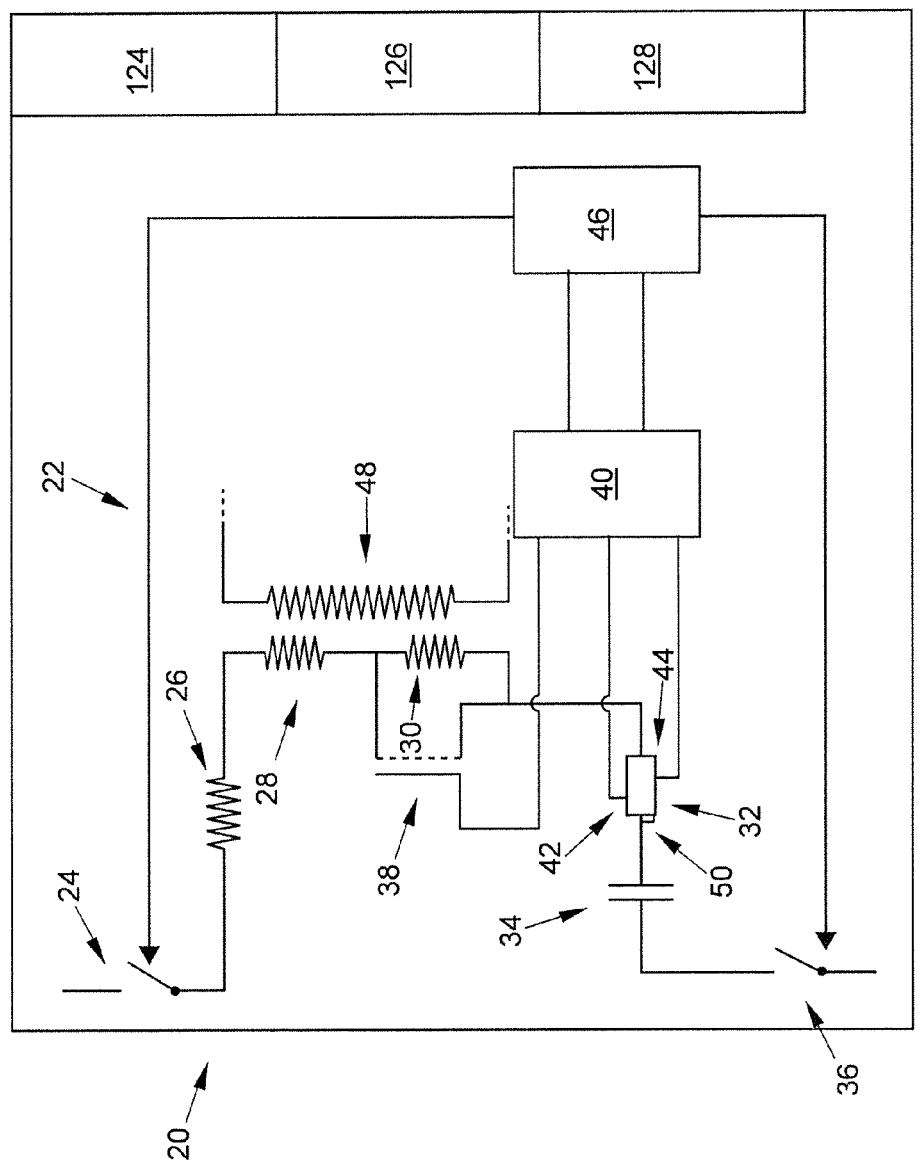
FIG. 2 is a schematic illustration of one embodiment of the resonant DC-DC converter according to the invention as a component part of one embodiment of the charger of the invention.

The embodiment of the charger 20 as illustrated schematically in FIG. 2 is to be arranged in a motor vehicle having at least one electrical machine which, in motor operation, is designed to drive or move the motor vehicle. For this purpose, the at least one electrical machine is provided with electrical energy from at least one electrical energy store of the motor vehicle, said electrical energy being converted into mechanical energy by the at least one electrical machine. In one implementation of the embodiment of the method according to the invention, the charger 20 illustrated in FIG. 2 is used for charging the at least one electrical energy store, also referred to as battery or rechargeable battery, usually high-voltage battery or rechargeable battery.

Said charger 2 comprises, as a first electronic stage or electronic component, the first embodiment of the resonant DC-DC converter 22, which can also be referred to as a resonant DC voltage converter. Moreover, said charger 20 comprises further electronic stages 124, 126, 128, three of which are illustrated schematically by way of example.

Said DC-DC converter 22 comprises on the primary side, as electronic components, a first switch 24, embodied here as a transistor, a first coil having an inductance CP0, said first coil being embodied as an inductor coil 26, a second primary-side coil, which is embodied as a first primary side transformation coil 28 and has the inductance LP1, a third primary-side coil, which is embodied as a second primary side transformation coil 30 having the inductance LP2, a current measuring circuit, embodied here as a measuring resistor 32, a capacitor 34 having the capacitance CP, and a second switch 36 likewise embodied as a transistor here.

In the presented embodiment of the DC-DC converter 22, these electronic components mentioned are connected in series and form a primary-side electrical circuit. In addition, a field effect transistor 38, embodied here as a metal oxide semiconductor field effect transistor, is connected in parallel with the third coil or the second transformation coil 30. Moreover, the DC-DC converter 22 comprises a computing unit 40, which is embodied here as a microcontroller and which is connected to the field effect transistor 38.

Moreover, said computing unit 40 is connected to the measuring resistor 32 at a first measuring point 42 and at a second measuring point 44. Consequently, a respective present value of an operating parameter of the measuring resistor 32 is to be detected by the computing unit 40. Moreover, the computing unit 40 is connected to an electronic circuit 46, embodied here as a digital signal processor. Furthermore, provision is made for said electronic circuit 46 to be connected both to the first switch 24 and to the second switch 36, wherein a respective switch 24, 36 is to be opened or to be closed via the electronic circuit 46.

Furthermore, the DC-DC converter 22 comprises on the secondary side a coil, which is likewise embodied as a transformation coil 48 and which is arranged alongside the two primary side transformation coils 28, 38 parallel thereto. The primary side transformation coils 28, 30 and the secondary side transformation coil 48 are designed to interact with one another. The second transformation coil 30 is turned on or off depending on the state of the field effect transistor 38. In this case, the second transformation coil 30 is connected to the other primary-side electronic components if it is turned on. If the second transformation coil 30 is turned off, it is disconnected from the other primary-side electronic components. Consequently, a primary-side current flows either only through the first primary side transformation coil 28 or both through the first primary side transformation coil 28 and through the second primary side transformation coil 30.

If the primary-side current flows through the at least one primary side transformation coil 28, 30, an electromagnetic field is generated by said primary side transformation coil 28, 30. In this case, the electromagnetic field also affects the secondary side transformation coil 48, wherein a secondary-side current is induced in said secondary side transformation coil 48 by said electromagnetic field.

When the first embodiment of the method is implemented, the second primary side transformation coil 30 is driven by the normally off field effect transistor 38. If only the first primary side transformation coil 28 is switched on or enabled and is thus activated, a primary-side inductance of the DC-DC converter 22 results from a sum of the inductances of the inductor coil 26 and of the first primary side transformation coil 28. In this case, a resonant frequency fR of the DC-DC converter 22 is: fR=0.5/π*(CP*(LP0+ LP1))−0.5. However, if the second primary side transformation coil 30 is driven and thus switched on or enabled, as a result of which the second primary side transformation coil 30 is activated, this results in the following for the resonant frequency fR of the DC-DC converter 22:

$$fR=0.5/\pi*(CP*(LP0+LP1+LP2))^{-0.5}.$$

Furthermore, proceeding from the computing unit 40 and the electronic circuit 46, taking account of at least one resonance curve that is saved and thus stored in the computing unit 40, a controller parameter for at least one of the two switches 24, 26 is adapted, here matched on the basis of the at least one resonance curve in the computing unit 40.

The measuring resistor 32 or measuring shunt as an embodiment of the current measuring circuit is designed to measure a current flowing through the primary side, here a resonance current. For this purpose, a value of a voltage is tapped off by the computing unit 40 via the measuring points 42, 44 at the measuring resistor 32, from which the flowing current is determined and monitored by the computing unit 40. Furthermore, said measuring resistor 32 is assigned a thermal sensor 50 or temperature sensor that measures a respective present value of a temperature of the measuring resistor 32. The value presently measured in each case for the measuring resistor 32 is compared with a limit value permissible therefor for the temperature of the measuring resistor 32. If the present value of the temperature exceeds the limit value, overload protection is realized, usually for the complete DC-DC converter 22, by the current being turned off.

The adaptation of the controller parameters for the two switches 24, 36 is carried out by the computing unit 40 and the electronic circuit 46. In this case, a value for the switched-on duration of the at least one switch 24, 36 is calculated and predefined at least by the computing unit 40 taking account of the at least one resonance curve. In this case, the value for the switched-on duration as determined by the computing unit 40 is determined depending on at least one operating parameter of the DC-DC converter 22 and the at least one switch 24, 36 is set by the electronic circuit 46 depending on the respectively provided and/or predefined value for the switched-on duration.

If a value of the current that flows through the measuring resistor 32 and is monitored by the computing unit 40 exceeds a limit value, the primary-side current is reduced by carrying out a power reduction, as a result of which the temperature of the DC-DC converter 22 is in turn reduced as well.

The resonant DC-DC converter 22 generates an alternating voltage that is furthermore required for transmitting electrical energy of a galvanically isolated transformer, here of a high-voltage transformer as one of the further electronic stages 124, 126, 128 of the charger 20. An alternating electromagnetic field is generated for this purpose. In this case, the generation of the alternating electromagnetic field is generated by at least one further field effect transistor embodied as a MOSFET, a plurality of such field effect transistors being embodied as an H-bridge. In this case, via the switches 24, 36, electrical current for providing the electrical energy is switched into the transformation coils 28, 30, these two transformation coils 28, 30 being resonant with the capacitor 34 depending on the switching frequency. In this case, said switching frequency is dependent on the load point and is adapted depending on the output voltage and output power, as a result of which operation of the DC-DC converter 22 is regulated.

During operation of the embodiment of the DC-DC converter 22, in comparison with the DC-DC converter 2 presented with reference to FIG. 1, by means of the switching off or on and thus by means of the deactivation or activation of the additional or second primary side transformation coil 30 via the field effect transistor, depending on the operating point of the DC-DC converter 22, a number of turns through which the current flows is adapted, usually increased or reduced. As a result, a resonance of the primary side of the DC-DC converter 22 is to be supervised, usually altered, and an optimum operating range is thus to be achieved for the DC-DC converter 22, wherein losses, generally on account of evolution of heat in the electronic components of the DC-DC converter 22, are to be reduced and thus the efficiency thereof is to be increased.

In this case, depending on the at least one characteristic curve stored in the computing unit 40 or the microcontroller, a respective operating range and thus at least one operating point of the DC-DC converter 22 are known. In this case, taking account of the at least one resonance curve as a possible characteristic curve, an output voltage and an outgoing current of the DC-DC converter 22 are to be adapted, wherein the output voltage can be e.g. 300 V and the outgoing current can be e.g. 10 A.

In this case, the field effect transistor 38 is supervised by the computing unit 40, wherein a respective operating point is calculated and assessed by the computing unit 40. If a changeover of the field effect transistor 38 from "on" to "off" or from "off" to "on" is provided on account of such an assessment, then the field effect transistor 38 is switched on or off by the computing unit 40.

Depending on the state of the field effect transistor 38, the one second or further additional primary-side transformation coil 30 is activated or deactivated. As a result, overall a number of turns of a total inductance of the DC-DC converter 22 and thus a turns ratio with respect to a number of turns of the secondary side transformation coil 48 are altered, as a result of which in turn the efficiency thereof is to be improved.

Additionally, as a result of the switching on or off of at least one of the switches 24, 36 by means of the computing unit 40 the resulting resonant frequency is likewise supervised, switching times being adapted, as a result of which the DC-DC converter 22 is to be kept at resonance. It is taken into account here that a change in the inductance of the DC-DC converter 22 is coupled to the resonant frequency thereof.

The embodiment of the DC-DC converter 22 as presented with reference to FIG. 2 comprises, alongside the first primary side transformation coil 28, only one additional primary side transformation coil 30, with which the field effect transistor 38 is connected in parallel.

In a further configuration it is possible for a further embodiment of a DC-DC converter according to the invention to have a plurality of further primary side transformation coils alongside the first primary side transformation coil, wherein all primary side transformation coils are connected in series and are arranged parallel next to a secondary side transformation coil. In this case, a field effect transistor is connected in parallel with each further primary side transformation coil. Each field effect transistor is to be supervised via the computing unit. Consequently, a number of active and passive primary side transformation coils and thus the number of turns and resonant frequency of the DC-DC converter are to be varied for this embodiment of the DC-DC converter depending on the operating point.

Figure 3:
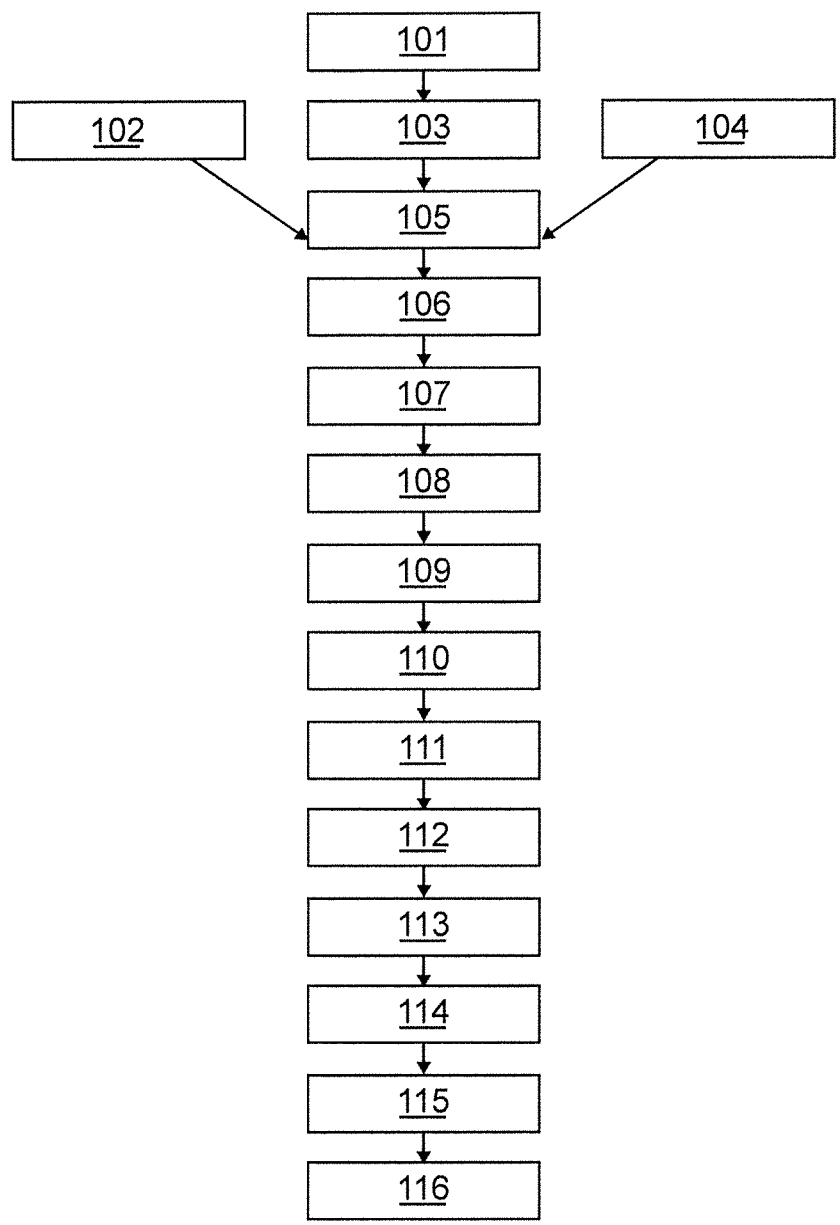
FIG. 3 is a diagram for implementing one embodiment of the method according to the invention.

When carrying out the embodiment of the method according to the invention, as set out with reference to the diagram from FIG. 3, a plurality of steps 101, 102, 103, 104, 105, 106, 107, 108, 109, 110, 111, 112, 113, 114, 115, 116 are carried out.

In this case, a first step 101 involves assessing an integral of a previous charging power as an operating parameter of the charger 20, a charging power in a time period of recent days, weeks or months being taken into account here. If a value of said integral is at least of the same magnitude as a definable limit value for the charging power, a temperature of a cooling medium of the charger 20 is detected and assessed as an operating parameter, the value of the temperature likewise being compared with a limit value.

Moreover, a third step 103 involves measuring an external temperature of the charger 20 as an operating parameter, and assessing it by comparison with at least one limit value provided therefor. A fourth step 104, which is usually carried out at the same time as the second and third steps 102, 103, involves detecting a temperature of at least one electronic component and thus of at least one electronic component part of the charger 20 as a further operating parameter and assessing it by comparison with a limit value respectively provided therefor.

Furthermore, a fifth step 105 involves measuring a throughput of electrical energy through the charger 20 as an operating parameter and comparing it with a limit value provided therefor. If the value of the throughput of electrical energy is greater than the limit value provided therefor, a sixth step 106 involves determining values of a respective power as an operating parameter of a respective power path or rail, wherein a respective value of such a presently detected power for a respective power path, e.g. for a primary-side or secondary-side electrical circuit, is compared with a limit value provided therefor. If it emerges here that all power paths are in order, a seventh step 107 involves detecting and assessing current loadings of electronic components, at least of coils, capacitors, resistors, semiconductors and/or transformers, of the charger 20 as an operating parameter. If these are in order, an eighth step 108 involves assessing the last charging processes of the charger 20 taking account of thermal conditions and accordingly at least taking account of an external temperature prevailing in surroundings of the charger 20, as operating parameters.

If values for the external temperature and thus temperature conditions as operating parameters are lower than a maximum limit value predefined therefor, a ninth step 109 involves determining and assessing a present charging current as an operating parameter. Moreover, an optimum efficiency of the charger 20 is calculated in the context of the ninth step 109 on the basis of a predictive expected state of charge (SOC) as an operating parameter of at least one electrical energy store which is to be supplied by the charger 20. If a current or charging current is lower than a maximum limit value provided therefor and if the calculated efficiency is greater than a present efficiency of the charger 20, a tenth step 110, here a decision step, involves checking whether a present efficiency is lower or higher than a predefined desired value.

If the tenth step 110 reveals that the value of the efficiency is lower than the desired value, in the eleventh step 111 the computing unit 40 determines a point in time of changeover for a transformer transformation of the at least one switch 24, 36 and of the field effect transistor 38 as semiconductors for adapting the number of turns of the primary side transformation coils 28, 30 to the number of turns of the secondary transformation coil 48 depending on the calculated optimum efficiency and switches the at least one switch 24, 36 and/or the field effect transistor 38 either on or off.

Furthermore, a twelfth step 112 involves adapting, as operating parameters, controller parameters of the resonant DC-DC converter 22 for minimizing switching losses of said semiconductors. Moreover, said controller parameters are also adapted to the new turns ratio.

Said operating parameters are automatically adapted in a thirteenth step 113, on the basis of the at least one resonance characteristic curve stored in the computing unit 40. Such an adaptation is carried out at least depending on a predefinition for a desired value of an alternating current as an operating parameter.

In this case, predefinitions for a desired value of the voltage and a desired value of the direct current, a predefinition for a switching frequency of the DC-DC converter 22 and a predefinition for the resonant frequency of the DC-DC converter 22 are taken into account as operating parameters.

Figure 5:
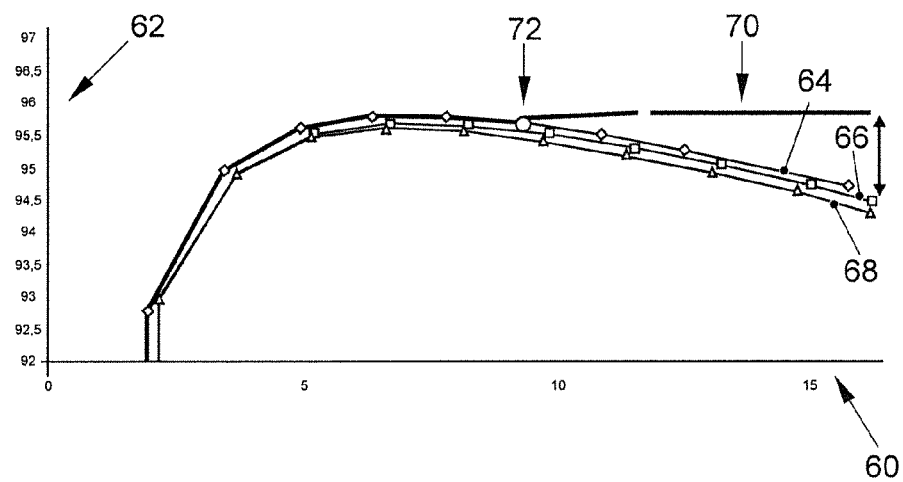
FIG. 5 shows a diagram with operating parameters of one embodiment of the charger of the invention.

Furthermore, with regard to a fourteenth step 114, an increase arises both in the back region and in the front region of a curve 64, 66, 68 or characteristic curve of the efficiency of the charger 20 as shown in FIG. 5.

In parallel therewith, a fifteenth step 115 involves monitoring the value of the current that flows through the current measuring circuit, embodied here as a measuring resistor 32, and a sixteenth step 116 involves monitoring the temperature of the measuring resistor 32 as further operating parameters.

Figure 4:
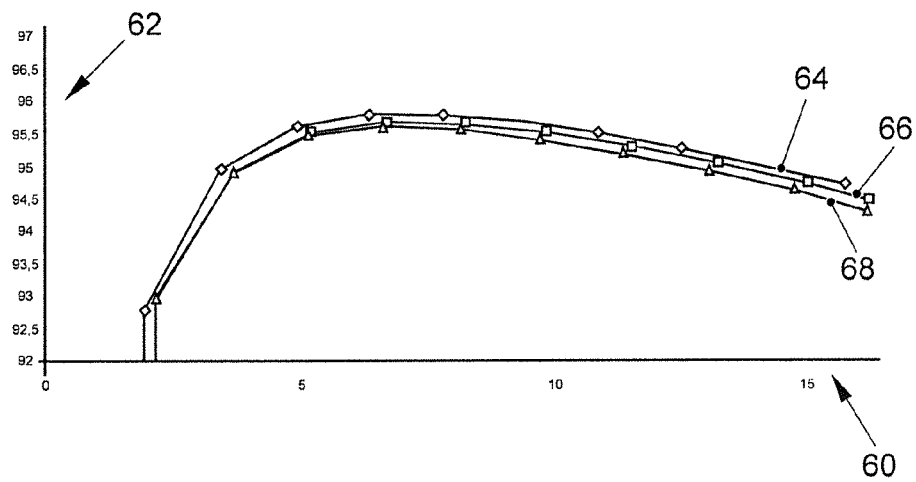
FIG. 4 is a diagram with operating parameters of a charger that is used in accordance with the prior art.

The two diagrams from FIGS. 4 and 5 in each case comprise an abscissa 60, along which values of an alternating current that flows through the DC-DC converter 22 are plotted in amperes. Moreover, each of these two diagrams comprises an ordinate 62, along which percentage values of the efficiency of the charger 20 are plotted against the abscissa 60.

In the first diagram from FIG. 4, a first characteristic curve 64, a second characteristic curve 66 and a third characteristic curve 68 of the efficiency of a charger known from the prior art are plotted as a function of the alternating current for different operating points. In this case, all three curves 64, 66, 68 show that the efficiency decreases with increasing values of the alternating current.

These three curves 64, 66, 68 are likewise entered into the diagram in FIG. 5 for comparison purposes. Moreover, the diagram from FIG. 5 comprises an additional curve 70, which arises for the charger 20 when carrying out the embodiment of the method with said charger. In this case, an operating point 72 is indicated along said curve 70, at which operating point, in the context of the method, controller parameters and/or the resonant frequency are/is altered by the adaptation of the turns ratio of the DC-DC converter 22, as a result of which an otherwise customary loss is reduced.

Thus, inter alia, a point in time for changeover is supervised as a controller parameter. Moreover, an adaptation of the resonant frequency is carried out, as a result of which the efficiency of the DC-DC converter 22 is to be optimized.

What is claimed is:
1. A DC-DC converter comprising:
   a first primary side transformation coil and at least one second primary side transformation coil that are arranged in series one behind another;
   a secondary side transformation coil arranged alongside each of the first and at least one second primary side transformation coils;
   a respective semiconductor switch being connected in parallel with the at least one second primary side transformation coil, the at least one second primary side transformation coil being switched on or off by the semiconductor switch;

a computing unit configured to alter the state of the respective semiconductor switch to alter a ratio of a number of turns of the first and at least one second primary side transformation coils to a number of turns of the secondary side transformation coil depending on a present value of at least one operating parameter of the charger to optimize and efficiency of the charger.

2. The DC-DC converter of claim 1, that has at least one switch connected in series with the primary side transformation coils, the at least one switch is either to be closed or opened depending on the present value of the at least one operating parameter of the charger.

3. The DC-DC converter claim 2, wherein the at least one respective semiconductor switch is a field effect transistor.

4. The DC-DC converter of claim 1, wherein a current measuring circuit is connected in series with the primary side transformation coils, the current measuring circuit detecting at least one operating parameter of the DC-DC converter.

5. The DC-DC converter of claim 4, wherein the computing unit is connected to the current measuring circuit at two measuring points, via which the current measuring circuit is to be monitored by the computing unit.

6. The DC-DC converter of claim 5, wherein the at least one switch is to be opened or to be closed by the computing unit.

7. A charger for charging an electrical energy store, the charger having the DC-DC converter of claim 1.

8. A motor vehicle comprising the charger of claim 7.

* * * * *